United States Patent [19]

Wingler et al.

[11] 3,865,904
[45] Feb. 11, 1975

[54] ADDITIVES FOR POWDER RESINS

[75] Inventors: Frank Wingler, Leverkusen; Richard Müller, Bergisch Neukirchen; Dieter Pollheide, Leichlingen, all of Germany

[73] Assignee: Bayer Aktiengesellschaft, Leverkusen, Germany

[22] Filed: Dec. 15, 1972

[21] Appl. No.: 315,621

[30] Foreign Application Priority Data
Dec. 22, 1971 Germany............................ 2163675

[52] U.S. Cl.............. 260/901, 260/17 R, 260/23 R, 260/23 AR, 260/23.3, 260/23.5 A, 260/42.21, 260/78.5 BB, 260/823, 260/836, 260/851, 260/856, 260/857, 260/859, 260/873, 260/896, 260/899, 117/17, 117/21

[51] Int. Cl. ........................ C08f/29/50, C08f 37/18
[58] Field of Search ................................... 260/901

[56] References Cited
UNITED STATES PATENTS
3,551,374   12/1970   Reinhard et al. .................. 260/901

Primary Examiner—Murray Tillman
Assistant Examiner—J. Ziegler
Attorney, Agent, or Firm—Connolly and Hutz

[57] ABSTRACT

Copolymers of (meth)acrylates and $\alpha,\beta$-monoolefinically unsaturated carboxylic acid having three to five carbon atoms are used as additives for improving levelling, glass and reactivity in powder lacquers. Said powder lacquers contain polymerized units of at least 35% by weight of styrene and (meth)acrylate and 5 to 30% by weight of at least one monomer containing a hydroxyl, carboxyl, glycidyl, N-methylol or N-methylol ether group. The powder lacquer mixture contains 0.1 to 5% by weight of the additive.

4 Claims, No Drawings

ADDITIVES FOR POWDER RESINS

This invention relates to additives based on copolymers of olefinically unsaturated carboxylic acids with (meth)acrylic acid esters for use with powder resins synthesised predominantly from styrene and acrylic compounds.

Additives for improving levelling and gloss and for reducing crater formation in solvent-containing lacquers are already known. Such additives are generally oily to wax-like compounds such as silicone oils, hydrocarbon waxes, cellulose acetobutyrate, paraffins, polyesters and low molecular weight polyacrylic acid esters having long-chain alcohol radicals. If, however, these levelling agents are added to powders for use in electrostatic powder spraying or in fluidisation dip-coating, either the stability of the powder in storage is adversely affected, or incompatibilities occur, and these effects are reflected either in hazing or in exuding of the additive.

In addition, it is known from German Auslegeschrift No. 1,569,040 that copolymers of methyl methacrylate with acrylates having from one to 10 carbon atoms in the alcohol radical can be added to polyvinyl chloride in quantities of from 0.1 to 25% by weight in order to improve the processibility of the polyvinyl chloride and the surface finish of mouldings produced from it.

It is further known from German Offenlegungsschrift No. 1,918,893 that certain polyacrylic acid esters can be used as lubricants for thermoplastic resins.

These additives are unsuitable for use with duroplastic acrylate powder resins predominantly styrene and acrylates because they are not compatible with such resins. If, for example, a copolymer comprising 70 parts by weight of 2-ethylhexyl acrylate and 30 parts by weight of ethyl acrylate is mixed with a duroplastic styrene-containing powder resin in a quantity of from 0.1 to 5% by weight, hazing occurs. It is possible under a scanning electron microscope to observe disintegration in the powder resin into two phases. After baking, these acrylate lubricants exude causing a tacky surface.

The object of the invention is solvent-free, compatible additives for duroplastic powder resins synthesized predominantly from styrene and acrylic compounds which additives improve both the processibility of the powder resins and the surface properties of coatings formed therefrom.

According to the invention, this object is achieved by using as additives solvent-free copolymers of $\alpha$, $\beta$-monoolefinically unsaturated carboxylic acids having from three to five carbon atoms (carboxyl group included) with esters of (meth)acrylic acid. The copolymers preferably have an average molecular weight of from about 1,000 to 10,000 and a viscosity of from about 100 to 10,000 poises at a temperature of $t = 22°$ C and 1 to 1,000 poises at $t = 100°$ C.

After the additive containing powder mixture has been applied to a workpiece, the additives according to the invention promote the formation of a more uniform surface during baking. They cause a reduction in the danger of wrinkle and crater formation, increase gloss and in some cases considerably increases the reactivity of the powder resin and lowers the baking temperature.

The invention relates to the use of from 0.1 to 5% by weight, based on the resin mixture as a whole, of a solvent-free copolymer with an average molecular weight of from 1,000 to 10,000 and a viscosity of from 1 to 1,000 poises at 100° C, the copolymer comprising copolymerised units of:

I. from 1 to 20 parts by weight of an $\alpha$, $\beta$-monoolefinically unsaturated carboxylic acid containing from three to five carbon atoms (carboxyl group always included)
II. from 0 to 50 parts by weight of an ester of acrylic acid or methacrylic acid having from three to four carbon atoms in the alcohol radical; and
III. from 30 to 99 parts by weight of an ester of acrylic or methacrylic acid having from five to 20 carbon atoms in the ester alcohol group;

the sum of the parts by weight amounting to 100, as additives for duroplastic powder lacquers or powder lacquer mixtures containing polymerized units of at least 35% by weight of a mixture of styrene and acrylic compounds. quer mixtures synthesised predominantly from styrene and acrylic compounds.

The invention also relates to powder lacquer mixtures containing 1 from 0.1 to 5% by weight of a solvent-free copolymer comprising:
I. from 1 to 20 parts by weight of an $\alpha$, $\beta$-monoolefinically unsaturated carboxylic acid with three to five carbon atoms;
II. from 0 to 50 parts by weight of an ester of acrylic or methacrylic acid having from one to four carbon atoms in the alcohol radical; and
III. from 30 to 99 parts by weight of an ester of acrylic or methacrylic acid having from 5 to 20 carbon atoms in the ester alcohol group;

the sum of the parts by weight amounting to 100, and
2. from 95 to 99.9% by weight of a solvent-free copolymer comprising:
A. from 25 to 60% by weight of styrene;
B. from 10 to 70% by weight of at least one ester of (meth)acrylic acid; and
C. from 5 to 30% by weight of at least one of the monomers: hydroxy alkyl ester of an $\alpha$, $\beta$-unsaturated carboxylic acid having from three to five carbon atoms (carboxyl group included) and having from two to eight carbon atoms carbon atoms and having from two to eight carbon atoms in the hydroxyl alkyl radical; acrylamide; methacrylamide; an N-methylolamide of acrylic or methacrylic acid or an N-methylol alkyl ether thereof having from 1 to 4 carbon atoms in the alkyl ether radical; acrylic acid; methacrylic acid; glycidyl acrylate; glycidyl methacrylate; 2-phenyl allyl alcohol; hydroxy methyl norbornene; a reaction product of a hydroxyl group-containing monomer with an alkoxy methyl isocyanate; and
3. optionally from 1 to 50% by weight, based on the copolymer (2), of one or more external crosslinking agents comprising a methylolated urea or melamine resin; a polycarboxylic acid; a polyalcohol; a polyisocyanate; a blocked polyisocyanate; a polyepoxide; a polycarboxylic acid anhydride; a polyamide; a polyamine, a polyoxazoline or a polydihydroxazine.

In the context of the invention, $\alpha$, $\beta$-monoolefinically unsaturated carboxylic acids containing from three to five carbon atoms include, for example, acrylic acid, methacrylic acid, fumaric acid, maleic acid, itaconic acid and crotonic acid. Acrylic acid or methacrylic acid are preferred.

The monomers of group II comprise alkyl esters of acrylic and/or methacrylic acid having from one to four carbon preferably ethyl acrylate, butyl metacrylate or butyl acrylate.

Group III esters of acrylic acid and/or methacrylic acid having from five to 20 carbon atoms in the alcohol radical include, for example, pentyl, hexyl, octyl, 2-ethyl hexyl, dodecyl, octadecyl acrylic acid and methacrylic acid esters, preferably 2-ethyl hexyl acrylate.

In the context of the invention, powder resins predominantly containing styrene and acrylic compounds include duroplastic copolymers or copolymer mixtures which contain from 25 to 60% by weight of styrene, from 10 to 70% by weight of at least one ester of acrylic acid or methacrylic acid and from 5 to 30% by weight of at least one monomer having a reactive group, as defined under 2 C. Powders of this kind have an average molecular weight of from about 1,000 to 10,000, represent readily powdered resins which do not lump at temperatures of up to 50° C and which, applied to workpieces by any of the various powder-coating techniques, are filmforming at temperatures above about 90° C and bake to form highly crosslinking, hard coatings at temperatures above about 130° C. The powders contain in copolymerised form from 25 to 60% by weight, preferably from 30 to 60% by weight of styrene, from 10 to 70% by weight, preferably from 30 to 70% by weight, of at least one ester of acrylic acid or methacrylic acid with from one to 20, preferably from one to eight, carbon atoms in the alcohol component and from 5 to 30% by weight, preferably from 10 to 30% by weight, of at least one reactive monomer from the class of substances comprising hydroxy alkyl esters with from two to eight, preferably from two to four, carbon atoms in the alkyl radical of $\alpha,\beta$-mono-olefinically unsaturated carboxylic acids with from three to five carbon atoms, such as acrylic acid, methacrylic acid, fumaric acid, maleic acid, itaconic acid or crotonic acid, preferably acrylic and methacrylic acid; acrylamide and methacrylamide; N-methylol amides of (meth)-acrylic acid and N-methylol alkyl ethers thereof with from one to four carbon atoms in the alkyl radical, preferably N-methylol methyl ethers of methacrylic acid amide, acid, methacrylic acid, fumaric acid, maleic acid, itaconic acid or crotonic acid, preferably acrylic or methacrylic acid; glycidyl esters of acrylic acid or methacrylic acid; 2-phenyl allyl alcohol; hydroxy methyl norbornene; reaction products of monomers containing hydroxyl groups with alkoxy methyl isocyanates, preferably reaction products of hydroxy alkyl esters of (meth)acrylic acid containing from 2 to 4 carbon atoms in the alkyl radical with methoxy methyl isocyanate.

The copolymer powders may be either internally crosslinking or externally crosslinking. For external crosslinking, the resin preparations can contain a methylolated urea or melamine resin, a polycarboxylic acid, a polyalcohol, a polisocyanate or blocked masked polyisocyanate, a polyepoxide, a polycarboxylic acid anhydride, a polyamide or polyamine, a polyoxazoline or polydihydroxazine, in quantities of from 1 to 50% by weight, based on the styrene-containing copolymer. The external crosslinking agents are preferably used in quantities of from 10 to 40% by weight, preferred external crosslinking agents including hexamethoxymethyl melamine, adipic acid, isophorone diisocyanate, hexamethylene diisocyanates or prepolymers thereof having free or with caprolactam-, phenol- or oxime-masked isocyanate groups, polyepoxide resins with an epoxide equivalent from 800 to 1,500, triglydyl isocyanurate, pyromellitic acid anhydride and endomethylenetetrahydrophthalic acid anhydride.

The copolymers are prepared by conventional methods bulk, solution, dispersion or bead polymerisation, preferably by solution or bulk polymerization. Suitable methods are described for example in "Methoden der Organischen Chemie", Houben-Weyl, 4th Edition, Vol. 14/1, pages 24–556 (1961). In cases where polymerization is carried out in solution, it is possible to use such solvents as methylene chloride, ethanol, iso-propanol, n-propanol, n-butanol, iso-butanol, tert.-butanol, an acetic acid methyl to butyl ester, acetone, methyl ethyl ketone, benzene or toluene.

The polymerization reactions are generally carried out at temperatures of from 40° to 180° C.

Examples of suitable initiators include percarbonates; peresters such as tert.-butyl perpivalate, peroctoate; benzoyl peroxide; o-methoxy benzoyl peroxide; dichlorobenzoyl peroxide; azodiisobutyronitrile; used in quantities of from 0.5 to 3% by weight, based on monomer.

Conventional molecular weight regulators such as thioglycol, thioglycerin, methylvinyl carbinol, xanthogenates or tert.-dodecyl mercaptan, can also be used.

The copolymer solution is freed from the solvent in a suitable apparatus, preferably in evaporator screws or thin-film evaporators, at temperatures of from 90° to 180° C.

Bulk polymerization can be carried out for example by the process described in German Offenlegungsschrift No. 1,965,740. The additives are oily to highly viscous liquids at room temperature. They are mixed with the powder resins either before, during or after their preparation. The additives can be added for example to a monomer mixture before polymerisation or may be subsequently mixed in before the polymer is worked up. The additives can also be mixed in at the same time as pigments, catalysts and cross-linking additives in mixing screws. It is also possible, for example to prepare initially a fairly high concentrated master batch and thereafter to dilute this master batch with the required resin to the requisite concentration of from 0.1 to 5% by weight of additive, based on total resin.

The additives give an improved gloss to the coatings. After baking at temperatures of from 100° to 220° C, coatings containing the additive as claimed show a smoother surface compared with preparations which do not contain these additives. The tendency to form wrinkles, known among those skilled in the art as the orange-peel effect, is distinctly reduced. In addition, the additives reduce the danger of the formation of craters which is particularly serious in the event of contamination with epoxide powders. Whereas craters are formed in the event of contamination with powders of other raw materials in the absence of additives, they do not occur when these additives are present. Addition of the additives according to the invention also brings about an increase in reactivity which, in some cases, is reflected in a reduction of about 5° to 10° C in the baking temperature. The additives described are compatible with the powder resins predominantly synthesised from styrene and acrylate compounds, do not cause hazine and are not exuded, even during baking. It was surprising that they also leave undiminished the stability of the resin mixture in storage.

The resin mixtures can be mixed with up to 150% by weight, preferably up to 100% by weight, based on copolymer of inorganic or organic pigments at temperatures of from 80° to about 120° C. Examples of pigments include titanium dioxide, iron oxides, chromium oxide, phthalocyanine and azo pigments.

The melts can also have added to them (0.1 to 5% by weight, based on copolymer) levelling agents such as silicones, polyesters, cellulose derivatives and catalysts, such as organic and inorganic acids, tertiary amines, dicyanodiamine or tin compounds.

The solvent-free, optionally pigments duroplastic mixtures which are brittle in their uncrosslinked state are ground after cooling to a fine grain size of from about 30 to 120$\mu$ and, optionally, graded according to grain size.

The powders are still free flowing at temperatures of at least 40° C, preferably 60° C, have levelling temperatures of from about 80° To 120° C and are baked over periods of from 15 to 30 minutes at temperatures of from 130° C to 220° C, preferably from 160° to 180° C, with accompanying crosslinking.

The powders are preferably applied to suitable substrates, especially metals, by conventional electrostatic powder-spraying methods (40 to 90 kV). cf D.R.Davis, "Coating with electrostatic dryspray" in Plastics Technology, June 1962, pages 37 to 38.

The powders can also be applied by other known methods, for example by fluidised dip-coating or by flame-spraying techniques.

The baked films (thickness from 40 to 300$\mu$) of the polymer mixed powders used in accordance with the invention show outstanding bond strength and hardness coupled with elasticity. They are also distinguished by their higher gloss, smooth, fault-free surface and by their resistance to weathering.

The powders can be used for coating domestic appliances, metal components in vehicle building, metal components which are heavily exposed to weather, such as vehicle bodywork, facade panels, pipes, wire netting, and for coating tools for use in forestry and agriculture. These additives can, of course, also be added to improve the film properties of other powder resin systems such as epoxide resins, polyester or polyurethane resins, resins based on polyamides, polyvinyl chloride, polyolefins, solventcontaining binders such as alkyd lacquers, epoxide lacquers, polyisocyanate-polyol lacquers, melamine and urea combinations, acrylic lacquers, indene-coumarone binders, coating agents based on cellulose derivatives such as nitrocellulose or cellulose acetobutyrate.

Preparation of the additives for the powder mixtures and their use as electrostatically sprayable powders, are described in the following Examples. The parts and percentages quoted in the Examples are parts and percentages by weight, unless otherwise stated.

PREPARATION OF THE ADDITIVE

The monomers and solvents quoted in Table 1 are mixed together under nitrogen in a 0.3 litre mixing vessel and heated to reflux temperature. 1.5 g of tert.-butyl peroctoate are introduced over a period of 5 hours, followed by stirring at 100° C for 8 hours. The solvent is distilled off in vacuo and the contents heated after the distillation to a temperature of 160° C under a vacuum of 1 mm Hg. The syrup is poured off while still hot.

Table 1

|  | Additive A | Additive B | Additive C | Additive D |
| --- | --- | --- | --- | --- |
| Ethyl acrylate | 30 g | — | 20 g | 40 g |
| Butyl aceylate | — | — | — | — |
| 2-Ethylhexyl acrylatae | 70 g | 90 g | 75 g | 45 g |
| Acrylic Acid | 1.2 g | 10 g | 5 g | 15 g |
| Tert.-dodecyl mercaptan | 2.0 g | 2.0 g | 2.0 g | 2.0 g |
| Toluene | 60 g | — | 60 g | — |
| Isobutanol | — | 60 g | — | — |
| Methyl glycol acetate | — | — | — | 60 g |
| Viscosity at 100°C,poises | 6 | 380 | 18 | 600 |
| Osmometric molecular weight | 7200 | 5600 | 6200 | 7000 | a. Comparison example without additive 100 parts by weight of a resin comprising 10% by weight of acrylic acid, 55% by weight of styrene and 35% by weight of butyl acrylate, 13 parts by weight of p-phenylene-bisoxazoline and 113 parts by weight of titanium dioxide (rutile), are mixed together and the resulting mixture fused in an extruder at a temperature of 120° C. The melt is cooled, ground into a powder with an average particle diameter of 80$\mu$ and sifted. The powder is sprayed with a conventional spraying machine at 40 kV onto degreased iron panels and then baked at 160° C for 30 minutes. The surface shows the typical orange-peel effect and has an average age of 5 craters per 100 m².

b. Comparison example with lubricant according to German Offenlegungsschrift No. 1,918,893

The resin used in the previous comparison example is initially mixed in an extruder with 2% by weight of a lubricant according to German Offenlegungsschrift No. 1,918,893, comprising 30% of weight of ethyl acrylate and 70% by weight of 2-ethylhexyl acrylate, commercially available under the trade name Modaflow (trade mark; a product of the Monsanto Company, USA). The mixture becomes hazy. Electro-microscope pictures of a fracture surface of the resin show division into two phases. The fracture shows the coherent resin phase in which a spherical phase of the lubricant with a diameter of 1 to 2$\mu$ is embedded. The lubricant phase can be washed out by treatment with pentane vapour, leaving behind clearly discernable cavities in the thin-layer. By contrast, the starting resin without lubricant is crystal clear and has a fracture surface which shows a single-continuous phase which does not show any cavities after treatment with pentane.

The lubricant-containing resin is mixed with pigment and bis-oxazoline in accordance with the previous comparison example (a), and the resulting mixture applied onto degreased iron panels. After baking, the test panel has a greasy surfacecoating which can be washed off with pentane and which, according to the nuclear resonance spectrum, is identical with the starting lubricant.

EXAMPLE 1

The procedure of comparison example (b) is repeated, but with 2% by weight of additive (B) instead of the lubricant. The resin-additive mixture remains completely transparent. The sprayed test panel has a fault-free, smooth surface with a Gardner gloss of 96°, no craters and no greasy surface covering. The additive cannot be removed with pentane.

EXAMPLES 2 to 4

The resins and resin-hardener mixtures described below are mixed with 100 parts by weight, based on 100 parts by weight of resin-hardener mixture, of titanium dioxide and with 1.5% by weight, based on the resin, of levelling agents A, C and D. The resulting mixtures are fused in an extruder at 100° to 110° C, cooled and then ground into powders with an average particle diameter of 80μ. Degreased iron panels are sprayed with the powders and then baked at 160° to 200° C for 30 minutes.

Resin I comprises 45% by weight of styrene, 25% by weight of methacrylic acid amide-N-methylol butyl ether, 6% by weight of butane diol monoacrylate and 24% by weight of ethylhexyl acrylate.

Resin II comprises 45% by weight of styrene, 20% by weight of the reaction product of methacrylic acid hydroxy ethyl ester with methoxy methyl isocyanate, 5% by weight of acrylamide and 30% by weight of butyl acrylate.

Resin-hardener mixture III comprises a copolymer of 50% by weight of styrene, 20% by weight of glycidyl methacrylate and 30% by weight of ethyl acrylate with 7 parts by by weight of adipic acid and 0.1 part by weight of benzyl dimethyl amine to 100 parts by weight of resin.

After baking at 200° C for 30 minutes, the preparation comprising Resin I with 1,5% by weight of the additive D, based on on resin I, gives fault-free smooth coatings without formation of any craters or wrinkles and having an Erichsen indentation value of 8 mm. In the absence of additive D, the test panel has 10 craters per 100 cm² and a porous surface. Even after baking at 200°, an Erichsen value of only 4 mm is obtained. The test panel without additive D can only be deep-drawn up to 8 mm without marking after stoving at 225° C for 30 minutes.

The preparation comprising resin-hardener mixture III with 0.5% by weight of additive A, based on the resin-hardener mixture also gives a fault-free high-gloss coating after baking at 180° C for 30 minutes. The test panel does not show any signs of crater formation.

After baking at 180° for 30 minutes a mixture of resin II and 3% by weight of additive C, based on resin II, gives a smooth, high-gloss crater-free coating with extreme hardness and elasticity (Erichsen value: 8 mm according to DIN 53 156).

We claim:

1. A composition comprising from 0.1 to 5% by weight of a solvent-free copolymer having an average molecular weight of from 1,000 to 10,000 and a viscosity of from 1 to 1,000 poises at 100° C., said copolymer comprising copolymerized units of:
   I. from 1 to 20 parts by weight of an α,β-monoolefinically unsaturated carboxylic acid having from three to five carbon atoms;
   II. from 0 to 50 parts by weight of an ester of acrylic acid or methacyclic acid having from one to four carbon atoms in the alcohol radical and
   III. from 30 to 99 parts by weight of an ester of acrylic or methacrylic acid having from five to 20 carbon atoms in the ester alcohol, and from 95 to 99.9% by weight of a solvent-free copolymer, said copolymer comprising copolymerized units of:
   A. from 25 to 60% by weight of styrene;
   B. from 10 to 70% by weight of at least one ester of acrylic acid or methacrylic acid and
   C. from 5 to 30% by weight of at least one member selected from the group consisting of a hydroxy alkyl ester of an α,β-unsaturated carboxylic acid having from three to five carbon atoms and from two to eight carbon atoms in the hydroxy alkyl moiety; acrylamide; methacrylamide; an N-methylolamide of acrylic or methacrylic acid; acrylic acid; fumaric acid; maleic acid; itaconic acid; crotonic acid and methacrylic acid.

2. The composition of claim 1 wherein C is selected from the group consisting of acrylic acid, fumaric acid, maleic acid, itaconic acid, crotonic acid and methacrylic acid.

3. The composition of claim 2 wherein C is acyrlic acid.

4. The composition of claim 1 wherein I is acrylic acid, III is 2-ethylhexyl acrylate, B is butyl acrylate and C is acrylic acid.

* * * * *